Aug. 21, 1951          C. L. OHMAN          2,564,989
                       CHAIN SAW LINK
                      Filed Sept. 8, 1947
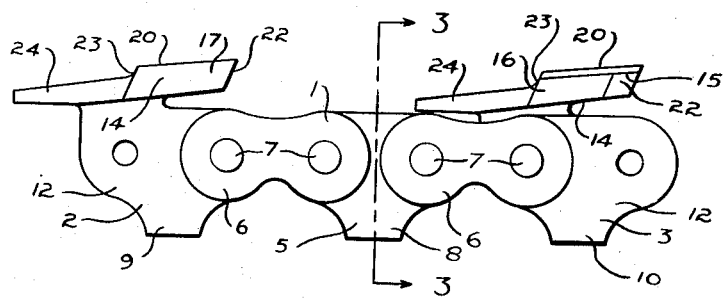
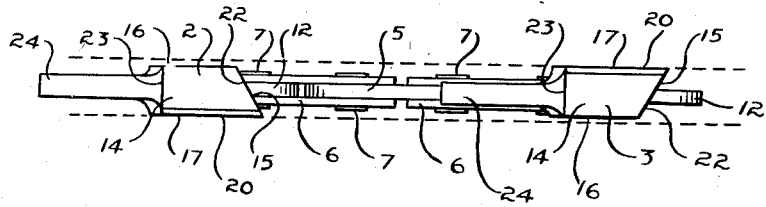
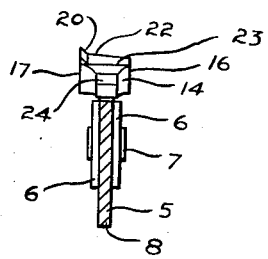
INVENTOR
CARL L. OHMAN
Ernest E Carver
ATTORNEY Patented Aug. 21, 1951

2,564,989

UNITED STATES PATENT OFFICE 2,564,989

CHAIN SAW LINK

Carl L. Ohman, Tahsis River, British Columbia, Canada

Application September 8, 1947, Serial No. 772,713

3 Claims. (Cl. 143—135)

My invention relates to improvements in chain saws.

The object of the invention is to provide a chain saw in which each cutting tooth serves to make a side cut of appropriate depth, to remove the wood so acted upon with a slice cut, and also to act as a raker to remove the sawdust or cuttings from the kerf. A further object is to provide a chain saw having one side edge of each cutting tooth of substantial area, which bears upon a side wall of the kerf to prevent chatter and keep said tooth in strict alignment with the cut. A still further object is to ensure that the teeth will not tend to rock about their transverse axes during the passage of the saw through the wood.

Referring to the drawings:

Figure 1 is an elevational view of a section of the chain saw.

Figure 2 is a plan view.

Figure 3 is a sectional view taken on the line 3—3 of Figure 1.

In the drawings like characters of reference indicate corresponding parts in each figure.

The numeral 1 indicates generally a length of chain saw made up of cutting teeth 2 and 3 and a centre link 5 which are connected together by side links 6 and rivets 7 in the usual manner. The centre link 5 consists of a blank of sheet metal having a lug 8 on its lower edge adapted to be engaged by teeth of a driving sprocket, not shown, which also engage similar lugs 9 and 10 on the lower edges of the teeth 2 and 3 respectively.

The teeth 2 and 3 each consist of a link portion 12 of a width equal to that of the centre link 5 and an enlarged substantially horizontal cutter head 14 with an oblique chisel shaped cutting edge 15. The side edges 16 and 17 of the cutter 14 are parallel to the centre of the chain, the side edge 16, however, is spaced a lesser distance from the said centre, so that the width of the tooth is slightly less than the width of the kerf as shown in Figure 2. The side edge 17 of the cutter head 14 lies in a vertical plane and projects above the surface of the cutter head 14 to form a side cutting rib 20, the cutting rib extending between the leading edge 22 and the trailing edge 23 of said cutter head. A centrally disposed tongue 24 of a width less than the cutter head 14 extends rearwardly of the edge 23, so as to normally contact the adjacent centre link 5 and prevent the tooth from rocking about its transverse axis. The teeth 2 and 3 are obviously right and left hand teeth.

The cutting ribs 20 of the above described teeth will cut spaced parallel grooves, the wood therebetween being sliced clear by oblique chisel shaped cutting edge 15 and the kerf will be raked clear of wood particles.

In sharpening the teeth 2 and 3, a simple face grind sharpens both the cutting edge 15 and the side cutting rib 20, and since the cutter head is of substantial length, the saw can be sharpened many times without shortening the head 14 to the point where it may chatter or lead to one side while being drawn through the kerf.

Obviously the point of the cutting edge 15 may be set from time to time prior to grinding to overcome the rounding incidental to normal wear.

What I claim as my invention is:

1. In a chain saw, a tooth comprising a link portion having an enlarged cutter head, said cutter head having a top face and a side face, said side face being of substantial area and lying in a plane parallel to the plane of the link, said head terminating at its forward end in a face lying in a plane inclined rearwardly from the intersection of the forward end face and the side face and rearwardly from the intersection of said forward end face and the top face to form a cutting edge at the second mentioned intersection, a longitudinally extending rib formed on said top face with one side face of the rib lying in the plane of the side face and the forward end face of the rib lying in the plane of said forward end face to form a cutting edge on the forward end of said rib which cutting edge is in advance of the first mentioned cutting edge.

2. In a chain saw having cutting links and centre links connected together by rivets, a tooth comprising a link portion having an enlarged cutter head, said cutter head having a top face and a side face, said side face being of substantial area and lying in a plane parallel to the plane of the link, said head terminating at its forward end in a face lying in a plane inclined rearwardly from the intersection of the forward end face and the side face and rearwardly from the intersection of said forward end face and the top face to form a cutting edge at the second mentioned intersection, a longitudinally extending rib formed on said top face with one side face of the rib lying in the plane of the side face and the forward end face of the rib lying in the plane of said forward end face to form a cutting edge on the forward end of said rib, which cutting edge is in advance of the first mentioned cutting edge, said rib extending rearwardly to the rearmost rivet of the tooth.

3. In a chain saw having side, centre and cutting links, each of said cutting links comprising a link portion surmounted with a head portion having a side face, a top face and a front face, said side face lying in a plane parallel to a side of the link portion and extending above the top face of the head portion to form a rib of inverted V-shaped cross section with the front face of the head and the forward end of the rib lying in the same plane.

CARL L. OHMAN.

REFERENCES CITED

The following references are of record in the file of this patent:

UNITED STATES PATENTS

| Number | Name | Date |
|---|---|---|
| 464,646 | Chaney | Dec. 8, 1891 |
| 1,261,989 | Zesbach | Apr. 9, 1918 |
| 1,339,091 | Benefiel | May 4, 1920 |
| 2,351,112 | Day | June 13, 1944 |
| 2,372,534 | Victor | Mar. 27, 1945 |

FOREIGN PATENTS

| Number | Country | Date |
|---|---|---|
| 4,049 | Great Britain | Feb. 15, 1897 |